Figure 1:
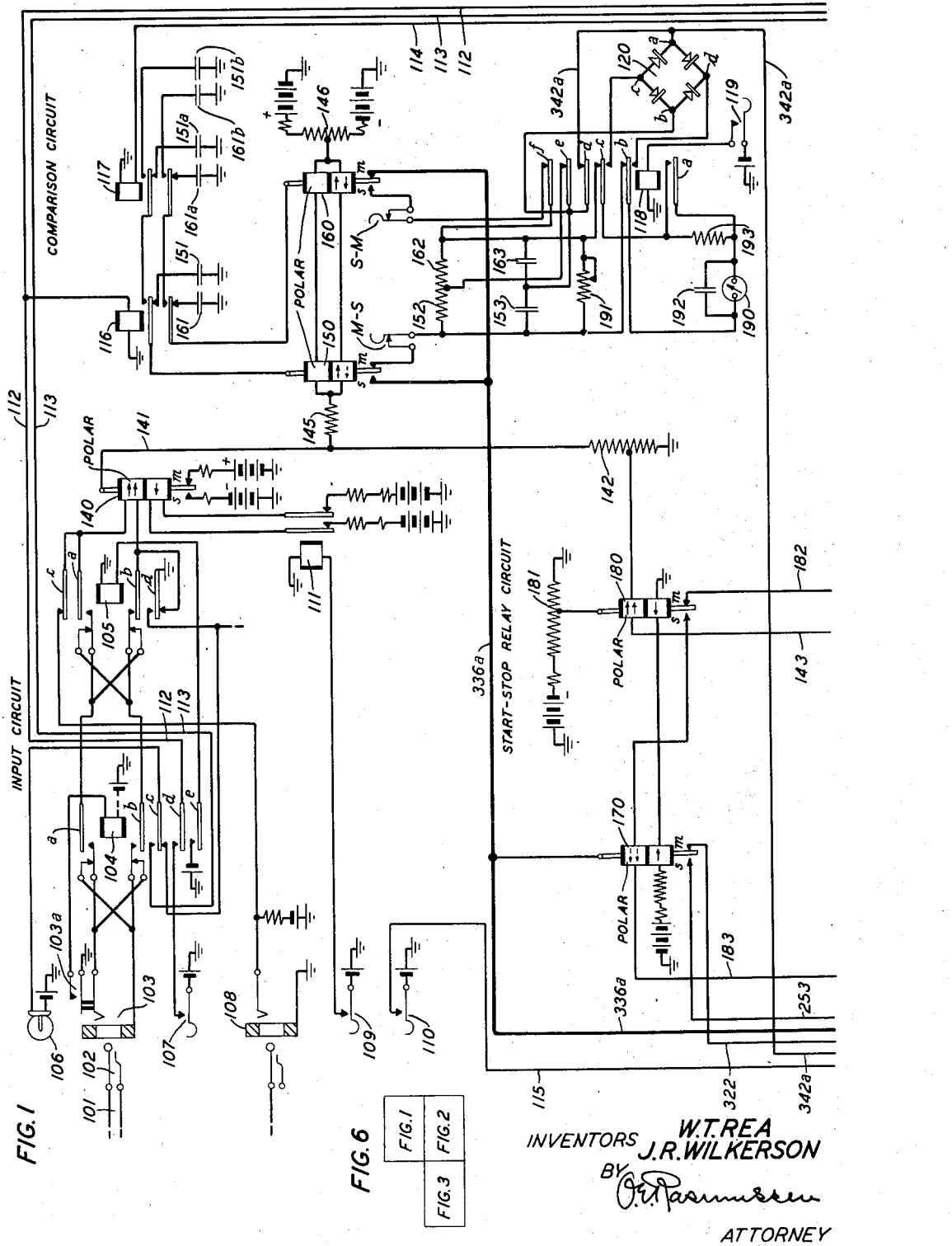

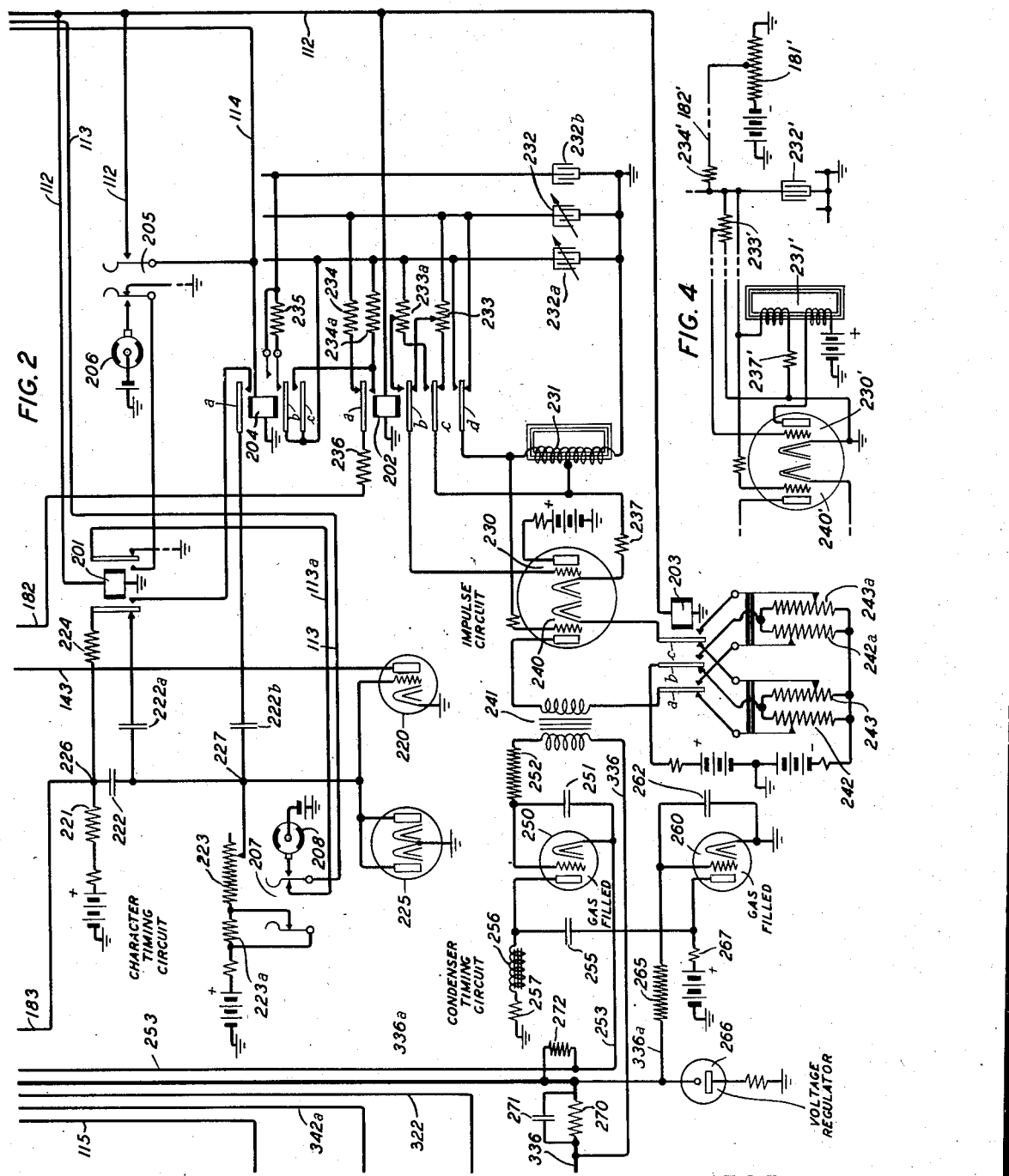

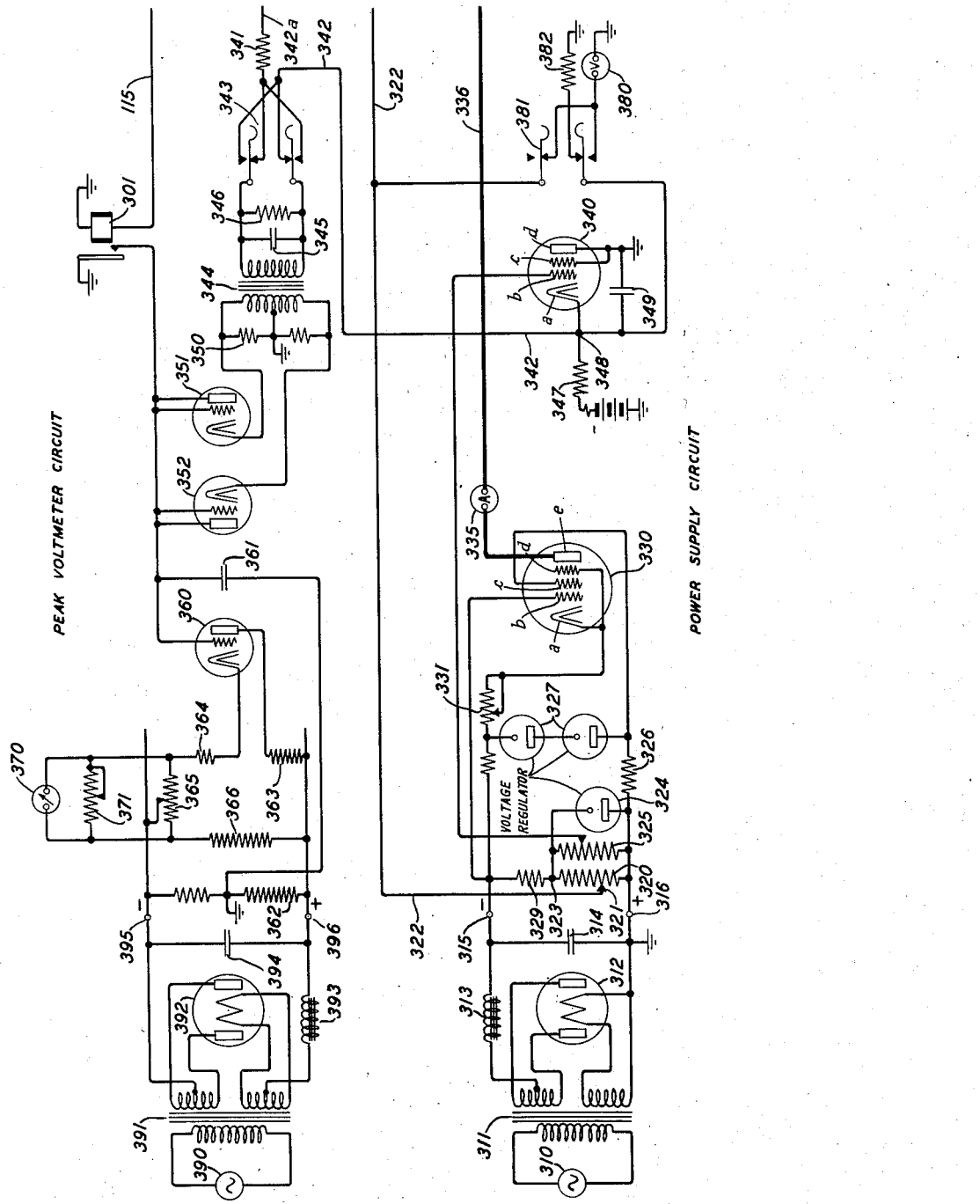

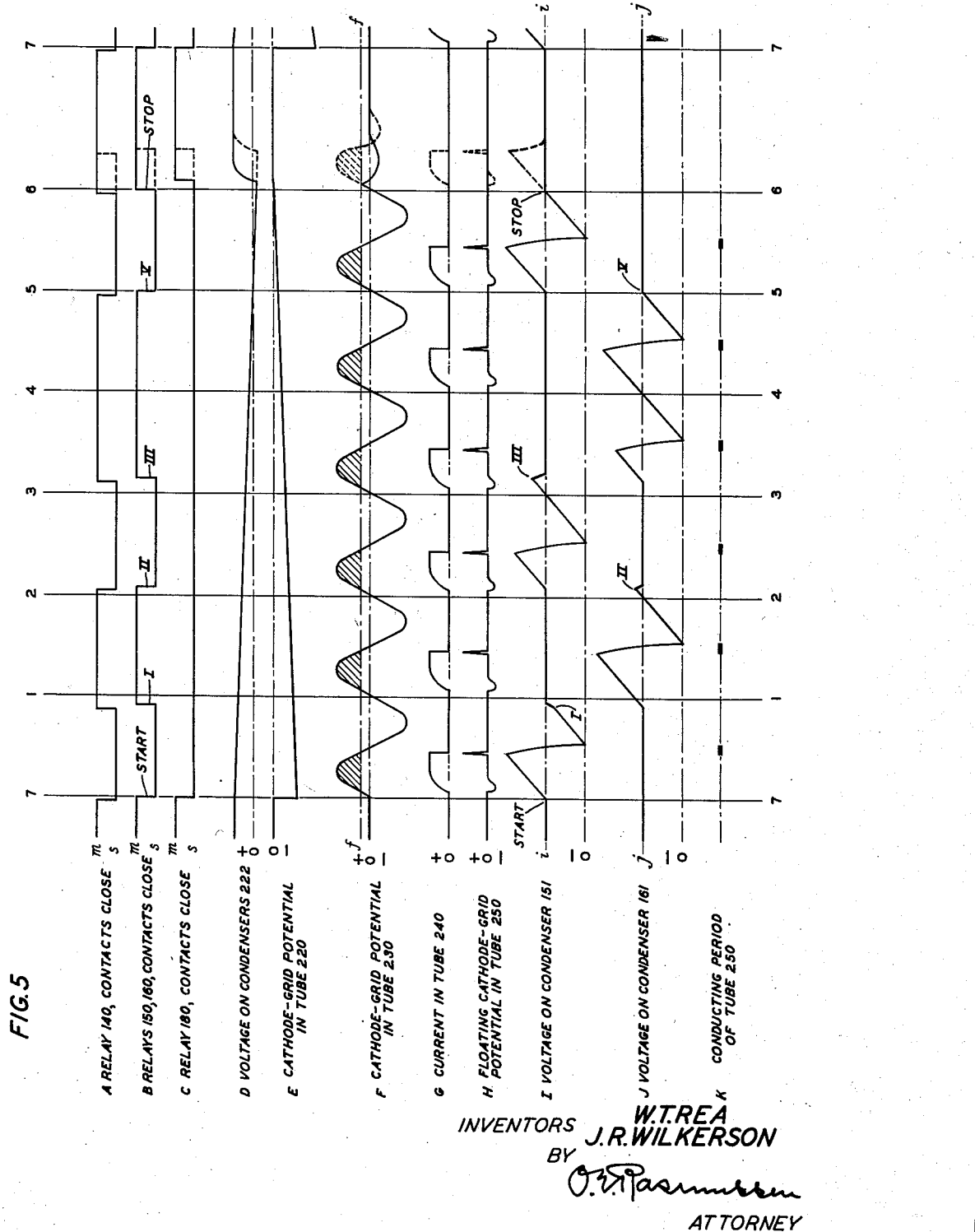

Patented Mar. 6, 1945

2,370,685

UNITED STATES PATENT OFFICE 2,370,685

ELECTRICAL TIMING CIRCUIT

Wilton T. Rea, Bayside, and Jefferson R. Wilkerson, Brooklyn, N. Y., assignors to Bell Telephone Laboratories, Incorporated, New York, N. Y., a corporation of New York Application February 28, 1942, Serial No. 432,823

17 Claims. (Cl. 178—69)

This invention relates to electrical timing circuits and, more particularly, to timing circuits used in start-stop telegraph systems for timing of operations therein.

It is an object of the invention to provide timing circuits of this kind which are more stable and accurate than those hitherto used.

Timing circuits of this kind may be used in start-stop signaling systems of different types having the common requirement that operations in response to the individual pulses of an incoming signal must be accurately timed with respect to the incoming start pulse of the signals. Such timing circuits may thus be used in start-stop telegraph receivers and regenerative repeaters and in various types of test circuits used for the observation of operating conditions in the teletypewriter plant.

Different types of timing systems have been proposed in the past for this purpose.

Thus, it has been general practice to use a rotary start-stop distributor for determining the timed intervals. This type of device has certain disadvantages, when operated at high speed and where high accuracy of timing is desired, because the mechanical starting mechanism as well as the constantly running friction clutch used with this apparatus are subject to wear and, therefore, tend to variably affect the operation of the distributor, particularly at starting. Another disadvantage of this type of device, when used at high speed, is to be found in the fact that there is a certain minimum length of the distributor segments below which definite, well-formed timing impulses cannot be produced by the segments; this has been found to be particularly disadvantageous in certain testing systems for checking the operating conditions of the teletypewriter plant.

It has also been proposed to use a timing system without mechanical rotating parts but based on oscillating relay circuits or on oscillating circuits using gas-filled tubes for the timing of the individual pulses and using similar oscillating relay or tube circuits, more slow acting, for stopping the pulse timing oscillator at the end of each signal train.

Reference may be had to United States Patents 1,771,445, issued to Parker-Vernam on July 29, 1930, and 2,154,623, issued to Kinkead on April 18, 1939, disclosing oscillating relay circuits of this kind, and 2,133,456, issued to Kinkead on October 18, 1938, disclosing oscillating circuits using gas-filled tubes for timing purposes. Reference may also be had to United States Patent 2,132,678, issued to Cowan October 11, 1938, disclosing a signal distortion measuring device for teletypewriter circuits which uses a rotating start-stop distributor for timing the operations of the measuring device.

With the steady demand for increased efficiency of the telegraph plant, the speed of telegraph operation has been greatly increased during the last few years and further increase in speed may be anticipated. It is therefore evident that a higher degree of accuracy of operation of commercial telegraph apparatus will be necessary. For purposes of checking the operations of such telegraph apparatus, testing systems of different types have been developed which operate on a start-stop basis and such testing systems must necessarily be accurate within very narrow limits, in order to be able to indicate small deviations from the ideal operation of the commercial apparatus.

It is therefore a principal object of the invention to provide a start-stop timing system which is highly accurate and dependable in operation, and which will require less maintenance than present timing systems using rotary distributors.

It is a more specific object to provide a testing system of the kind disclosed in the patent to Cowan, referred to above, but adapted for operation with a timing system of the type provided in accordance with the invention for the purpose of securing a higher degree of accuracy and of enabling the testing system to measure a higher percentage of distortion.

In accordance with a feature of the invention, an oscillatory circuit is provided which is adapted to produce oscillations of voltage having a true sinusoidal wave shape and capable of being started from the steady-state condition substantially without extraneous transients, so that the first cycle will be substantially identical with the succeeding cycles. The circuit is also capable of being quickly damped to the steady-state condition within one cycle. The oscillatory circuit is of simplified design to enable it to produce a sinusoidal wave shape and associated with it is a vacuum tube circuit adjusted to have a constant amplification factor within the operating range and to sustain the oscillations at constant amplitude throughout at least one signal series of pulses. During the stop condition the circuit is held cocked by a start circuit including a suitable direct current source, whereby the oscillating energy is stored inductively while the static energy remains practically zero. The opening of this start circuit starts the oscillatory circuit upon its first sinusoidal cycle without transients or other harmonics than the basic.

Other objects and features of the invention will be apparent from the following detailed description of a specific testing system embodying the invention. It should, however, be understood that the various features of the invention may be incorporated in telegraph systems other than that described hereinafter, which is disclosed by way of example, for the purpose of fully explaining the invention and its mode of operation as incorporated in a practical system.

In the following detailed description of the testing system and its operation reference will be made to the attached drawings, in which:

Figs. 1, 2 and 3, when properly placed with respect to each other in accordance with the diagram in Fig. 6, show the circuit arrangement;

Fig. 4 shows an alternative impulse producing circuit which may be substituted for the impulse producing circuit included in the system shown in Figs. 1, 2 and 3; and Fig. 5 is a diagram showing the relative timing of various operating conditions in the circuit.

As already stated above, the system in various respects is similar to that disclosed in the Cowan patent and is adapted to be used for the same purposes, namely, to determine the appearance of normal and abnormal conditions in start-stop telegraph circuits as they affect the start-stop signals in such circuit.

Reference may, therefore, be had to the Cowan patent for an explanation of the different types of distortion that may be observed in start-stop signals by means of a testing system of the present type. The observations are made on two meters, as in the Cowan system, namely, the peak-voltmeter which gives steady indications of the maximum total distortion of any individual pulse, and the bias-meter which gives integrated indications of bias present in a plurality of successive pulses and which may be switched to indicate displacement of mark-to-space or space-to-mark transitions or average displacement of both.

Referring now to Figs. 1, 2 and 3 of the drawings, the system comprises a number of main portions as follows:

The "input circuit," shown in Fig. 1, whereby the set is connected, for example, to a commercial operating circuit and whereby the incoming signals are applied to the testing equipment.

The "comparison circuit," shown in Fig. 1, in which the incoming signals are received and caused to set up charges on a pair of unit condensers which, in turn, affect the two meters in accordance with their acquired charges once for each unit pulse of a series of pulses representing a character. This circuit includes the bias-meter.

An "impulse circuit," shown in Fig. 2, for establishing a series of uniformly separated reference instants, one for each unit pulse in a signal series. This includes the "condenser timing circuit" which conditions the unit condensers for each test.

A "character timing circuit," shown in Fig. 2, for stopping the impulse circuit at the end of a character series.

A "start-stop relay circuit," shown in Fig. 1, for starting the timing operations in response to an incoming start pulse and for restoring the system to normal in response to the stopping action of the character timing circuit.

The "peak-voltmeter circuit" shown in Fig. 3, and connected to the comparison circuit for giving an indication of the maximum distortion in the incoming signals during a convenient time interval, and obtaining its power through suitable equipment from an alternating current source.

A "power supply circuit," shown in Fig. 3, for supplying constant current and various potentials to the test system and obtaining its power through suitable equipment from an alternating current source.

The system, as shown in the drawings, is arranged for operation under a number of different conditions and for this reason includes a number of manual keys and neutral-type relays for adapting the different portions of the circuit to the specific conditions existing in the commercial circuit which is to be tested. Thus, the circuit, as shown in the drawings, may be adapted to test signals using a 7½ unit code or an 8½ unit code and it is apparent that it may be further adapted for a 7-unit code or other start-stop codes. The circuit, as shown, may also be adapted for different signaling speeds at the different codes. Thus, signals may be accurately tested having dot frequencies of 15, 23, or 28 cycles per second corresponding, for example, to 40, 60 and 75 words per minute for a code using 7½ units. The circuit is also adapted to test either neutral-type signals or polar signals.

A distortion measuring set of this type is usually permanently installed in a switchboard in the telegraph exchange and in that case is made available for tests at the various operators' positions by means of extension circuits and test set appearances each including the necessary jacks, meters, patching cords, indicator lamps and keys; the appearances are interconnected to cooperate in showing busy and idle conditions and normal or abnormal conditions of the test set at the various operators' positions. A circuit arrangement for such interconnection of operators' positions for the use of a common distortion measuring set at any one position is disclosed in United States Patent 2,244,566, issued June 3, 1941, to J. T. Neiswinter, and it will be readily apparent to those skilled in the art how the input circuit shown in Fig. 1 of the present drawings may be incorporated in such an interconnecting system.

It will first be assumed that the measuring set is to be used for the observation of start-stop signals in a commercial circuit using the 7½ unit code at a dot frequency of about 23 cycles per second and using signals of the neutral type, with marking pulses represented by current condition and spacing pulses represented by no-current condition in the line. Each character will thus be represented by a series of pulses beginning with a spacing start pulse and ending with a marking stop pulse and having five selecting pulse intervals between the start and stop pulses. Thus, a signal series of pulses representing a character begins with a "start" transition from marking to spacing followed by transitions I, II, III, IV and V from marking to spacing and spacing to marking at transition points 1, 2, 3, 4 and 5, respectively, in accordance with the code, and ending with a "stop" transition from spacing to marking. In a commercial system the length of a stop pulse is 1.42 times the length of the unit pulse during continuous transmission. An example of such a signal series representing a character is shown diagrammatically in Fig. 5—A.

The signals impressed upon the test circuit may be those passing between stations on a busy commercial circuit or they may be signals specially transmitted over an idle commercial circuit. The traffic need not be interrupted or otherwise disturbed by the tests.

The circuit is shown in the drawings as being in condition for operation with a line circuit of the assumed type and in rest condition, as during a stop interval.

Input circuit

The incoming line circuit 101, which may be connected in any desirable manner to a commercial circuit, is connected by the insertion of plug 102 into jack 103 to the line circuit within the set; this circuit is normally closed by normal contacts of relay 104. When the plug 102 is inserted the closing of contacts 103a of the jack causes the operation of relay 104 which, in operating, extends the line circuit to contacts of relay 105, where the line circuit remains closed through normal contacts of that relay.

A busy lamp 106 is now lighted over a circuit from battery through the lamp, make contact c of relay 104, conductor 113, break contacts of key 207 and break contacts of relay 201 to a ground applied from the interconnecting circuit, referred to above, for the operators' positions in a manner of no importance for an understanding of the invention.

Relay 105 is next operated from battery at make contacts e of relay 104 and thereby extends the incoming line circuit to the upper winding of polar relay 140. Relays 104 and 105 remain operated until the plug 102 is removed from the jack 103 at the end of an observation.

Comparison circuit

Relay 140 has a lower biasing winding normally tending to operate the relay to its spacing contact. When, as just described, the line circuit is extended to the upper winding of relay 140, marking current will flow in this winding during the stop condition, overcoming the biasing winding and holding the relay operated to marking, thereby supplying plus battery to the grounded potentiometer 142 and also over a resistance 145 through the windings of polar relays 150 and 160 to the mid-point of potentiometer 146, which point is at ground potential. It will be noted that when the set is not in use there is a normal holding circuit from battery at jack 108 over break contact c of relay 105 through the upper winding of relay 140 and over break contact d to ground for holding relay 140 normally to marking as shown in the drawings; when relay 105 is operated, this holding circuit is opened and relay 140 is held in marking condition by the marking condition of the incoming line circuit. Under this condition relays 150 and 160 are held to marking and relays 140, 150 and 160 are in condition to respond to the transitions of incoming pulses, relays 150 and 160 operating shortly after relay 140 to their marking and spacing contacts.

With the circuit in the condition shown, unit condensers 151 and 161 are connected over the marking contacts of relays 150 and 160 simultaneously to two different circuits, respectively, and these connections are reversed when relays 150 and 160 are operated to spacing. Condenser 161 is normally connected to the constant current supply circuit over marking contact of relay 160, constant current conductor 336a, resistance 270, constant current conductor 336, meter 335 to the constant current supply circuit at the plate e of vacuum tube 330. As will be explained subsequently, the constant current supply circuit is arranged to deliver a substantially constant current into a varying impedance or voltage, such as that of a charging or discharging condenser, so that normally the condenser 161 will become charged over the traced circuit with a constant current irrespectively of its increasing potential. However, under the stop condition, when condenser 161 is also connected over the marking contact of relay 170 and conductor 322 to adjustable point 321 of potentiometer 320. The potential applied from point 321 to condenser 161 remains fixed and is called the "stop-compensating voltage."

The other unit condenser 151 is normally connected over the marking contact of relay 150 to a reference potential, which circuit may be traced over the marking contact of relay 150, over resistance 152 and condenser 153 connected in multiple by contact e of relay 118, over contact d of relay 118, conductor 342a, resistance 341, contacts of key 343, primary winding of transformer 344, conductor 342 to point 348 of a potentiometer circuit from negative battery through resistance 347, the cathode plate circuit of vacuum tube 340 to ground. As will be explained subsequently, the reference potential at point 348 is maintained at a standard value which is used for comparison purposes in the tests to be described. Potentiometer 320 is so adjusted that the stop-compensating voltage at point 321 and the reference potential of point 348 will be equal during the stop condition. Thus, both unit condensers 151 and 161 are charged during the stop interval to a potential equal to the reference potential. The circuits for bias-meter 190 will be described below.

Peak-voltmeter circuit

The left winding of transformer 344 has a grounded mid-point and is connected through rectifier vacuum tubes 351 and 352 for rectification of current in both directions and for charging of condenser 361 over the circuit to ground at potentiometer 362. Under the rest condition of the system, as shown in the drawings, no current flows in the transformer and condenser 361 remains uncharged; however, during test conditions when current flows in one or the other direction through the primary of transformer 344, condenser 361 will acquire a charge which is applied to the grid of vacuum tube 360 for the peak-voltmeter 370. This meter is connected to the conjugate points of a Wheatstone bridge having the following arms: the first arm including resistance 363, cathode-plate circuit of tube 360, resistance 364; second arm, right side of potentiometer 365; third arm, left side of potentiometer 365; fourth arm, resistance 366. Direct current is applied to the supply points of the bridge circuit from the terminals 395 and 396 of a power supply equipment. With no charge on condenser 361 and a corresponding plate current in tube 360, the potentiometer 365 is adjusted to give zero current in the meter 370. The meter will then give an indication each time current flows through transformer 344 and causes condenser 361 to acquire a higher charge, and the deflection of the meter will be in proportion to the peak current in the primary winding of the transformer 344.

The key 343 serves to reverse the input to the peak-voltmeter circuit for checking the symmetry of the rectifier circuit. By means of adjustable resistance 371 across the meter terminals the meter may be calibrated. The bridge circuit for the meter is supplied with power from a source of alternating current 390, which may be a commercial power plant, through transformer 391 and full-wave rectifier 392 to the terminals 395 and 396, with series inductance 393 and shunt condenser 394 provided to smooth the ripple in the output circuit.

Start-stop relay circuit

During the stop condition the impulse circuit and the character timing circuit are held inoperative by means of relay 180. Polar relays 170 and 180 have lower biasing windings which are normally energized, the biasing winding of relay 170 normally operating the relay to marking, and that of relay 180 tending to operate the relay to spacing. The circuit for the upper operating winding of relay 170 is open at the spacing contact of relay 180. The upper operating winding of relay 180 is normally energized from plus potential on potentiometer 142 through the cathode-plate circuit of vacuum tube 220 in the character timing circuit. The operating winding, overcoming the biasing winding, holds relay 180 to marking. When relay 140, in response to a spacing pulse, operates to its spacing contact, negative potential is applied from potentiometer 142 to the plate circuit of tube 220 rendering the tube 220 non-conducting; relay 180 then operates to spacing, thereby starting the character timing circuit and the impulse circuit upon a cycle of operations.

Character timing circuit

The character timing circuit includes a set of timing condensers 222, 222a and 222b of which the first two normally are connected in multiple for use under the assumed conditions, namely, for a speed of 60 words per minute. Condensers 222 and 222a in multiple are normally charged from positive battery of 130 volts through resistance 221 to ground through the rectifier vacuum tube 225. Under this condition the upper plate of condenser 222 and the right-hand plate of condenser 222a, connected to point 226, will be at plus potential and the other plates, connected to point 227, will be at ground potential with a charge potential of 130 volts. Resistance 221 is comparatively low for quick charging of the condensers during the stop interval. With plus potential connected to the plate of rectifier 225, this tube will be in conducting condition; with the same potential applied to the grid and with positive potential applied to the plate of tube 220, this tube will be in conducting condition.

When the relay 180 operates to spacing in response to the operation of relay 140 to spacing, a comparatively low negative potential on the potentiometer 181 is applied over the spacing contact of relay 180 through the operating winding of relay 170 to the upper point 226 at one side of condensers 222 and 222a. With a potential of −20 volts applied in this manner to the point 226, the potential of point 227 will be −150 volts and both tubes 220 and 225 will be rendered non-conductive. Under this condition, condensers 222 and 222a will slowly discharge over a circuit from positive 130 volt battery through high resistance 223 to the negative potential on potentiometer 181. This discharge condition will prevail until the charge on the condensers has been reversed and raised to a value at which the condenser potential is about +20 volts, at which time the potential of point 227 will pass through zero and the tubes 220 and 225 will again become conductive. With tube 220 in conducting condition and relay 140 in marking position, relay 180 will be operated back to its marking position, thereby removing the negative potential from the condensers at point 226, so that the condensers thereafter will be quickly charged from plus battery over resistance 221 and through the rectifier tube 225, thereby restoring the character timing circuit to its original condition. The timing of the charging period for these condensers is such that they will be fully charged to 130 volts within a fraction of the stop interval and the timing of the discharging period of these condensers is such that, upon the discharge commencing immediately in response to a "start" transition, the condensers will have acquired their reversed charge of +20 volts for rendering the tubes 220 and 225 conductive, shortly after the normal arrival of the "stop" transition. The charging cycle for condensers 222 and 222a is shown diagrammatically in Fig. 5—D, and the corresponding variation in the cathode-grid potential in tube 220 is shown in Fig. 5—E.

It will be noted that a very high discharging potential is used in this circuit and that the effective point at which the timing period is terminated is only slightly past the middle point of the condenser voltage curve. Thus, the battery potential is 130 volts and the condenser potential is 130+20 or 150 volts at the moment the discharge commences, the total being 280 volts, which insures a steep voltage characteristic. The charge reverses at zero volts on the condenser and the current continues until the condenser has a voltage of 20 volts in the opposite direction. Therefore, the timing period will be terminated at a point at which the rate of change of voltage with time is high. The time at which the condenser reaches a charge corresponding to 20 volts in reverse direction thus will be sharply delimited and high accuracy of timing is thus secured.

This circuit has been found to operate satisfactorily with signals of the 7½ unit code at a speed of 23 cycles per second with the following circuit constants:

| | | |
|---|---|---|
| Resistance 221 _____ohms__ | | 4,650 |
| Condenser 222 _____microfarad__ | | .4 |
| Condenser 222a_____do____ | | .11 |
| Resistance 223_____ohms__ | | 385,000 |
| Resistance 224_____do____ | | 500 |
| Vacuum tube 220 manufactured by Radio Corporation of America____ | | Type 6Y6G |
| Vacuum tube 225 manufactured by Radio Corporation of America____ | | Type 6H6G |
| Plus battery through 2000 ohm resistance _____volts__ | | 130 |

Impulse circuit

The impulse circuit includes a double vacuum tube, which for the present purposes may be considered as two separate tubes, the right-hand portion 230 comprising an amplifier tube connected in the oscillatory circuit and the left-hand portion 240 operating as a detector in the output circuit of the oscillatory circuit.

The oscillatory circuit comprises the two-winding inductance coil 231 and the variable condenser 232, the lower junction point being grounded and the upper junction point being connected to the output circuit leading to the control grid of detector tube 240. The condenser 232 is normally connected to the upper junction by the break contacts d of relay 202, but may be replaced by condenser 232a or by both the condensers 232a and 232b by operation of relays 202 and 204 for changing the frequency of oscillation, as will be further explained below.

The cathode-anode circuit of tube 230 includes a direct current source and resistance 237 and is connected across the lower winding of coil 231 for compensation of the decrement of the oscillatory circuit. The control electrode is connected over the break contacts *b* of relay 202 to the adjustable point of potentiometer 233 which is bridged across the upper winding of coil 231 over break contact *c* of relay 202; by proper adjustment of the potentiometer point the oscillatory circuit may have zero decrement and the amplitude of oscillation will remain substantially constant over a period of more than ten oscillations for a given adjustment. The potentiometer 233 may be replaced by the potentiometer 233*a* by operation of relay 202 when the circuit is to be used at another frequency, thereby obviating readjustment of the tube circuit each time the set is used at different operating frequencies in the line circuit.

The condenser 232 may be adjusted for oscillation at 45.6 cycles per second corresponding to an operating speed of 22.8 cycles per second or 60 words per minute for a 7½ unit code. Thus the circuit may be adjusted to produce exactly one cycle for each standard pulse period of the signals, thereby establishing a series of accurate comparison instants in the test set.

However, for start-stop operation it is essential that the comparison instants be definitely related to the start instant during successive incoming pulse series and be uniformly spaced during each pulse series; it is therefore necessary that the oscillatory circuit be started and stopped for each pulse series. Thus during the stop condition the pulse circuit is held cocked, that is, it is prevented from oscillating by the application of a negative potential from the potentiometer 181 over the marking contact of relay 180, conductor 182, resistance 236, break contact *a* of relay 202 and resistance 234 to the upper junction of the oscillatory circuit. A steady-state condition is thus established during which current flows through the windings of coil 231, storing the energy of oscillation in the magnetic flux of the coil, and during which the charge on the condenser 232 is practically zero.

Upon removal of the negative potential by the operation of relay 180 in response to an incoming "start" transition the oscillatory circuit will be free to oscillate and the first oscillation will be identical with subsequent oscillations and thus will have the same amplitude and wave shape. In this manner it is possible to accurately establish a comparison instant even during the first cycle after release from the steady state, since with zero decrement there will be no gradual building up of the amplitude as in the case of starting an oscillatory circuit intended for continuous operation.

When relay 180 is operated to again close its marking contact in response to an incoming "stop" transition, the oscillatory circuit will quickly return to its steady-state condition under the damping effect of resistances 234 and 236. With the proper values of the negative potential at potentiometer 181 and of the resistances 234 and 236 for a given frequency, a current will flow in coil 231 during stop condition which will establish a desired amplitude of oscillation, at the same time as the effect of resistances 234 and 236 will be such as to return the circuit to the steady state in a critically damped manner, and well within the normal stop period.

Inasmuch as it is important to accurately establish the first reference instant, it is essential that the first cycle be started off without delay or distortion, as by transients or harmonics other than those that determine the regular wave shape of the oscillations. The importance of producing a sinusoidal wave shape, therefore, is apparent. Thus when by design the circuit is incapable of producing other harmonics than the basic, the oscillations may be started without transients and will remain constant if adjusted for zero decrement.

The main requirements for producing a sinusoidal wave form are, that the circuit must be simple and must contain no other energy storing elements than the inductance coil and the condenser. Stated more specifically the requirements are:

The output circuit should be purely resistive;
There must be no other capacitance than the condenser in the oscillatory circuit;
There must be no other inductance than the windings of the coil in the oscillatory circuit;
The two windings of the coil should have a co-efficient of coupling equal to unity;
The vacuum tube should be operated within the straight-line portion of its characteristic; and
The amplification factor of the tube should be such that dissipation of energy is compensated for.

A circuit designed to answer these requirements may be held cocked by a current through coil 231 from the damping circuit equal to the oscillatory current at maximum amplitude. When the current supply is disconnected (by relay 180) the current in the coil will decay, following a cosine curve identical with that of the subsequent oscillations; at the same time the condenser voltage will rise from its steady-state value of about zero volts, following a sine curve identical with that of the subsequent oscillations. Since the circuit by design is incapable of producing harmonics other than the basic, the first cycle will be free of extraneous transients.

For the purposes of the invention the desired sinusoidal operation of this circuit may be secured with sufficient accuracy by the use of apparatus and connections of the general high quality required for commercial equipment of this general type. Whereas the amplification constant may be calculated from the other circuit constants it is attainable in practice by adjustment of the tube circuit until the decrement disappears for a desired number of oscillations.

Thus the oscillating circuit will produce a uniform series of oscillations corresponding to each pulse series of the incoming signals and will be ready for a new series of oscillations every time a start pulse arrives. A series of voltage oscillations produced by the oscillatory circuit during a character series of pulses is shown diagrammatically in Fig. 5—F.

The following circuit constants for the impulse circuit have been found to give satisfactory operation at 22.8 cycles per second:

| | | |
|---|---|---|
| Inductance 231 | henries | 65 |
| Condenser 232 | microfarad | .165 to .210 |
| Potentiometer 233 | megohms | 4.5 |
| Resistance 234 | ohms | 3,600 |
| Resistance 236 | do | 4,900 |
| Resistance 237 | do | 1,000 |
| Equivalent resistance of potentiometer 181 | ohms | 1,000 |
| Potential at 181 | volts | −50 |
| Plate battery | do | +130 |
| Vacuum tube 230–240 made by Radio Corporation of America | | Type 6F8G |

An alternative arrangement for an oscillatory circuit having operating characteristics and main design principles similar to those of the oscillatory circuit shown in Fig. 2 and described above, is shown in Fig. 4.

Corresponding parts in the two circuits have been similarly numbered so that the circuit of Fig. 4 may readily be substituted for the corresponding circuit in Fig. 2.

Briefly describing the circuit in Fig. 4, the oscillatory circuit comprises the upper winding of the two-winding inductance 231' and the variable condenser 232', the lower junction point being grounded and the upper junction point being connected to the output circuit.

The cathode-anode circuit of tube 230' includes a direct current source and the lower winding of coil 231' for feeding back to the oscillatory circuit under control of the control electrode or grid which is connected to the adjustable point of potentiometer 233' bridged across the oscillatory winding of coil 231'.

The circuit may be adjusted to perform exactly like that in Fig. 2 though by different inherent operations, and it may be cocked in the same manner by the application of a steady-state current from the potentiometer 181' over conductor 182' and resistance 234' and through the oscillatory winding of coil 231'.

The requirements listed above for the circuit in Fig. 2 also hold for this circuit, which thus will include the main features of producing a sinusoidal wave shape with substantially zero change of amplitude for at least twenty oscillations, and of starting after being cocked without extraneous transients, its performance being illustrated in Fig. 5—F. This circuit thus is adapted to serve the purposes of the invention.

The detector tube 240 has its cathode-plate circuit connected over the primary winding of transformer 241, break contact a of relay 203, potentiometers 242 and 243 and break contact c of relay 203. The potentiometers 242 and 243 are connected across plus the minus batteries in series over break contacts b of relay 202 in such a manner that a positive potential may be supplied from potentiometer 242 to the plate and a lower potential from potentiometer 243 to the filament of tube 240. By adjustment of the potentiometer points individually, a desired potential difference may be applied to the cathode-anode circuit in the tube and by mechanically locking the two contact points together for simultaneous adjustment of them this potential difference may be maintained at the same time as a proper potential relation with respect to the grid of the tube is established for orienting purposes. It should be understood that the two potentiometers may be replaced by a single potentiometer with two adjustable points.

The control grid of tube 240 is connected to the upper junction of the oscillatory circuit so that an oscillating voltage will be impressed thereon. For a given adjustment of potentimeters 242 and 243, the tube 240 will be non-conducting while the potential impressed upon the grid is below a predetermined value, slightly negative relative to the cathode potential, and will be conducting when the potential on the grid is above this value. Thus, the tube will be conducting during the upper portions of each cycle of the oscillations, as indicated by the shaded portions in Fig. 5—F above the horizontal line f—f, which represents the critical potential at which the condition in the tube changes. The corresponding current pulses through the detector tube 240 and the primary winding of transformer 241 are shown diagrammatically in Fig. 5—G. By proper adjustment of the potentimeters 242 and 243 the critical potential and thus line f—f may be varied between the positive and negative maximum amplitudes of the oscillations, thereby shifting the instant at which the detector tube 240 becomes non-conducting between the instants of the maximum and minimum amplitudes.

In this manner, two voltage impulses will be generated in the secondary winding of transformer 241 during each cycle of the oscillations, namely, an impulse of relatively low maximum amplitude in a negative direction at the instant the detector tube 240 becomes conducting on the rising slope and an impulse of relatively high maximum amplitude in a positive direction at the instant the tube 240 becomes non-conductive on the descending slope. These impulses in the secondary winding of transformer 241 are schematically shown in Fig. 5—H. The positive voltage pulses from the secondary of transformer 241 are impressed upon the grid of the gas-filled tube 250 to render this tube conducting, whereas the negative pulses will have no effect upon the tube 250. There will thus be an impulse impressed upon the tube 250 once for each cycle and the impulse may be accurately oriented with respect to the start transition by means of the potentiometers 242 and 243 and is usually oriented to occur slightly before the center of each standard pulse period, not as established in the line circuit under test, but as established by the slightly delayed operations of relays 150 and 160, for control of the unit condensers 151 and 161.

*Condenser timing circuit*

The condenser timing circuit, including the gas-filled tubes 250 and 260, is provided to substantially instantaneously discharge one or the other of the unit condensers 151 and 161, whichever happens to be connected to the constant current circuit 336—336a at the middle of each pulse period after relay 170 has been operated to spacing at the arrival of a "start" transition.

The circuits for the gas-filled tube 250 may be traced as follows. The cathode is connected over conductor 253, spacing contact of relay 170 to the negative constant current conductor 336a to which is also connected, say, the grounded unit condenser 161. The plate circuit is connected to ground through inductance 256 and resistance 257. The control grid is connected over resistance 252, the secondary winding of transformer 241 directly to the negative constant current conductor 336. Thus, with no voltage impulse present in the secondary of transformer 241, the grid of tube 250 receives a negative potential relative to the cathode which is equal to the potential drop in resistance 270 of 15 volts due to the constant current flowing into unit condenser 161 and under this condition the gas-filled tube remains non-conducting. However, when a positive voltage impulse of, say, 60 volts from transformer 241 is impressed on the grid of tube 250, the tube becomes ionized and thus establishes an oscillatory discharging circuit from the grounded negatively charged condenser 161, through the tube and the inductance 256 and resistance 257 to ground. The condenser now quickly discharges and, due to the inductance 256, tends to charge in the positive direction.

As will appear from the detailed description below of the operation of the system the magnitude of the negative voltage on condenser 161, taken as an example, at the time it begins to discharge through the tube 250, depends on the arrival time of the last preceding transition. If, therefore, the condenser current were permitted to flow through the tube to charge the condenser in the positive direction, the tube would not be extinguished and the recharging of the condenser could not begin until the instant the current attained zero value; the positive condenser potential at this instant being nearly equal to the initial negative potential, it too would depend on the arrival time of the last transition. However, since the recharging of the condenser to negative potential is utilized for comparison purposes relating to the arrival time of the next transition, it must be made independent of any previous transition. This is attained by means of the circuit including the gas-filled tube 260.

The circuit for the gas-filled tube 260 may be traced as follows. The plate is connected through resistance 267 to positive battery and is also connected through a normally charged condenser 255 to the plate circuit of tube 250 and the oscillatory circuit just described. The cathode is connected to ground. The control grid is connected through resistance 265 to the constant current conductor 336a and thus normally receives a negative potential, thereby maintaining the tube 260 non-conducting. During the oscillatory discharge of condenser 161 through inductance 256, described above, the negative potential on the grid of tube 260 will quickly decrease with that of the constant current conductor 336a; when this potential passes through zero the tube 260 is fired, thereby lowering the positive potential of the lower side of condenser 255 to the sustaining plate potential of tube 260 and thus forcing the upper side of condenser 255 and the plate of tube 250 sufficiently negative to extinguish the latter tube. This thus removes the discharge condition from condenser 161, which now begins to charge to negative potential from the constant current conductor 336a. The firing of tube 260 establishes an oscillatory circuit comprising condenser 255 and inductance 256, and when the current in this circuit becomes zero, tube 260 is extinguished.

By this arrangement the current through condenser 161 is interrupted by the tube 250 at the instant the condenser potential reaches zero. The time interval between maximum and zero amplitude of potential in the oscillatory circuit being fixed by the frequency of oscillation and thus being independent of the maximum amplitude, the discharging time will be constant and the condenser will begin to recharge to negative from zero charge and at a predetermined instant, and thus independently of the previous transition. The charge and discharge of the unit condensers 151 and 161 under the control partly by the condenser timing circuit and partly by the comparison circuit is illustrated in Figs. 5—I and 5—J, respectively.

It will be noted that, when relay 170 opens its spacing contact at the beginning of the stop period, the cathode of tube 250 will be disconnected from the constant current conductor 336a. However, a permanent circuit is established from the cathode through the high resistance 272 to the constant current conductor to stabilize the potential of the cathode during the stop period and thus insure that the tube will remain extinguished.

By the circuit arrangements just described the discharge of the unit condensers may be completed in a very short time without exceeding the maximum permissible current in the discharge path. The current wave in this path is nearly of the form of a half-cycle sine wave and the ratio of peak current to the total charge dissipated is comparatively low in a wave form of this type. If the condensers were discharged in a resistive circuit, as would be the case with a mechanical distributor or contact interrupter, the current wave would be of exponential form, in which the ratio of peak value of current to total charge dissipated is very high. Thus the discharge of the unit condensers in the present system may be completed in a much shorter time than in the prior art systems.

The condenser timing circuit has been found to operate satisfactorily with the following circuit constants:

Gas-filled tubes 250 and 260 manufactured by Western Electric Company _____ Type 338A
Condenser 251 _____ microfarad__ .001
Resistance 252 _____ ohms__ 225,000
Condenser 255 _____ microfarads__ 4
Inductance 256 _____ henries__ 18
Resistance 257 _____ ohms__ 40
Condenser 262 _____ microfarad__ .0002
Resistance 265 _____ ohms__ 400,000
Resistance 270 _____ do____ 1,000
Condenser 271 _____ microfarads__ 4
Resistance 272 _____ ohms__ 100,000

The potential drop over resistance 270 is about 30 volts, and is normally applied in negative direction to the grid of tube 250. The impulses from transformer 241 reach about 60 volts applied in positive direction to tube 250, firing the tube.

With the condenser 151 or 161 of 5.4 microfarads in circuit with inductance 256 and resistance 257, the time for bringing the charge down through zero will be about .002 second, and the peak current through tube 250 and inductance 256 will not exceed .6 ampere assuming an initial condenser voltage of 165. With the circuit constants listed above the discharge of the unit condensers will be completed within ten per cent of the dot period, making the unit condensers available for test purposes during ninety per cent of the marking or spacing interval, respectively, and thereby permitting accurate measurements of distortions close to plus and minus forty-five per cent.

*Power supply circuit*

The power supply circuit derives power from any convenient source of alternating current 310 which may be a commercial power supply system. The current from the source 310 passes through a transformer 311 and a full-wave rectifier tube 312 to the supply terminals 315 and 316. An inductance 313 is serially included and condenser 314 is connected across this circuit to smooth the ripples in the output.

The reference voltage supply circuit includes the resistance 347 and the cathode-plate circuit of vacuum tube 340 forming a potentiometer which establishes the reference voltage at point 348. Under normal conditions the current consumption of this circuit is low. However, when a load is connected to conductor 342, variation of the potential of point 348 will be limited by the action of tube 340. When, for example, the potential of point 348 tends to become more negative, the grid-cathode potential becomes less negative. This in turn causes an increased flow of plate current, thereby causing the potential of point 348 to become less negative and thus compensating for the original tendency of this point. This action takes place at the instant one of the unit condensers 151, 161 is connected to point 348, for comparison purposes, charged to a higher negative potential than the reference potential; when the condenser potential is less negative than the reference potential the tube action will be reversed. This arrangement, therefore, maintains a substantially constant reference voltage at the times the comparisons between the reference voltage and the voltage of condenser 151 and 161 are made. Since the rate of change of potential drop versus current in the anode-cathode circuit of tube 340 is very low, this circuit may be looked upon as a battery of very low resistance which permits the unit condenser to be quickly discharged with a heavy current, which in turn will give a large deflection of the peak-voltmeter, as will be further explained below. Condenser 349 serves to further decrease the impedance of the reference voltage source.

A resistance bridge comprising resistances 326, 325 and 329 is connected across the output terminals 315 and 316, and a portion of the potentiometer 320 supplies the stop-compensating voltage over variable contact 321, as already referred to. The potentiometer 325 supplies an adjustable potential to the control grid b of the vacuum tube 340 for the reference potential circuit 342. In this manner the current in tube 340 may be controlled automatically to insure that the reference potential is equal to the stop-compensating voltage during the stop condition regardless of normal variations of the power supply voltage.

As already explained, the constant current is passed through potentiometer 320 only when relay 170 is in marking position, as during the stop interval. There are, therefore, two current conditions in potentiometer 320 which thus tend to react upon the potential of point 323 in the resistance bridge. This would consequently also affect the reference potential, which depends on the grid potential in tube 340 derived from potentiometer 325. To practically eliminate these variations in potentials, and also to reduce the effect of power voltage variations, a voltage regulator tube 324 is connected from ground to point 323, the potential of which, therefore, remains constant within very narrow limits. A more detailed explanation of the characteristics of the regulator tube 324 will be given hereinafter.

The constant current vacuum tube 330 has its cathode-plate circuit serially included in the constant current circuit 336 from the terminal 315. The cathode a of tube 330 is connected in series with resistance 331 which is adjustable to vary the grid potential and thereby the constant current through the tube. The current may be read on the ammeter 335.

The stop-compensating voltage and the reference potential may be checked on the meter 380 which is normally connected through key 381 to measure the stop-compensating voltage on conductor 322 and which, in the alternate position of key 381, will be connected to the point 348 of the reference potential, replacing resistance 382 in this circuit to insure that the reference potential remain unaffected by operation of key 381.

The constant current circuit being designed to supply a constant current against a wide range of potential in its output circuit, its voltage tends to rise excessively when its output circuit 336 is opened, as happens during the travel time of relays 150 and 160. To limit such excessive rise the voltage regulator 266 is connected to the constant current conductor 336a.

The voltage-regulating devices connected to different points in the circuit to stabilize operations are of well-known construction and are adapted to serve this purpose by their specific voltage-current characteristic. They are gas-filled tubes with low current consumption at normal voltage, but they consume a quickly rising current as the impressed voltage rises above the normal value. Devices of this type are manufactured by the Radio Corporation of America, Incorporated.

The regulator tube 266 is of type VR105-30 and is connected to conductor 336a to limit the potential of this conductor to about 105 volts.

The regulator tube 324 is of type VR150-30 and is connected across potentiometer 320 to stabilize the stop-compensating voltage.

The two regulator tubes 327 are of the type VR105-30 and are serially connected across the cathode and the screen grid of tube 330 to stabilize the constant current.

Normal operation

The operation of the system in response to an incoming pulse series representing a character will now be described and reference will be made to the schematic illustration of the various operations shown in Figs. 5—A to 5—K.

It will be assumed that the signal series, as received with a slight uniform delay by relays 150 and 160, has transitions such as illustrated at B of Fig. 5, namely, a "start" transition from marking to spacing, occurring at the standard transition instant indicated by the vertical line 7, transition I from spacing to marking and arriving ahead of the standard transition time indicated by the vertical line 1; transition II from marking to spacing arriving late with respect to the standard transition instant 2; transition III from spacing to marking and arriving late with respect to the standard transition instant 3; no transition IV; transition V from marking to spacing concurring with the standard transition instant 5 and the "stop" transition from spacing to marking concurring with the standard transition instant 6.

In response to the "start" transition relay 140 operates to spacing, thereby operating relays 150 and 160 to spacing.

Relay 150 removes the unit condenser 151 from the reference potential conductor 342a and connects it to the constant current conductor 336a. As shown in Fig. 5—I, the condenser begins to charge beyond the reference potential, indicated by the horizontal line i—i. Relay 160 removes condenser 161 from the stop-compensating voltage, applied to constant current conductor 336a over the marking contact of relay 170 during the stop condition, and connects it to the reference potential. These operations in response to a "start" transition do not affect the bias meter 190 or the peak-voltmeter 370.

Relay 140, in operating to spacing, applies negative potential through potentiometer 142 and upper winding of relay 180 to the plate circuit of the tube 220 which, therefore, becomes currentless. Relay 180 operates to spacing by means of its lower biasing winding. In spacing position relay 180 operates relay 170 in a circuit from −20 volts on potentiometer 181 through upper winding of relay 170, conductor 183, resistance 221 to plus battery. Tube 225 becomes non-conducting and the character timing circuit is thereby conditioned for the slow discharge of condensers 222 and 222a through high resistance 223. A negative, slowly rising potential is thus applied to the grid of tube 220 as illustrated in Fig. 5—E. It is evident that so long as the grid of tube 220 maintains the tube 220 in non-conducting condition the relay 180 cannot be operated in response to operations to marking of relay 140 during the signal series.

Upon the opening of the marking contact of relay 180, a potential of −50 volts on potentiometer 181 is removed from the oscillatory circuit of the impulse circuit which immediately commences its first oscillation in the positive direction without any interfering transients. When the oscillation has increased to a predetermined positive potential applied to the grid of vacuum tube 240, the cathode-anode path in this tube becomes conducting and remains conducting until the oscillation again decreases below this value, as shown in Fig. 5—F. Thus, a slowly rising and quickly falling current pulse flows through the detector tube and the primary of transformer 241 as shown in Fig. 5—G, thereby producing a small ineffective negative voltage impulse in the secondary of transformer 241 followed by a strong and very short positive voltage impulse, as shown in Fig. 5—H. By proper adjustment of the orienting potentiometers 242 and 243 to secure a proper relation between the cathode-grid potential and the cathode-anode potential of tube 240 the strong positive impulse in the secondary winding of transformer 241 may be oriented to occur exactly at the proper instant in relation to the center of each standard pulse period, as determined by the operations of relays 150 and 160 on distortion-free signals.

With the positive voltage from transformer 241 applied to the grid of tube 250 at the proper instant, this tube is fired and thereby connects the grounded inductance 256 over conductor 253, spacing contact of relay 170, constant current conductor 336a and spacing contact of relay 150 to the unit condenser 151, the charging of which thus will be discontinued, as shown in Fig. 5—I. Condenser 151, which now is included in the oscillatory circuit with inductance 256, quickly discharges to zero potential, at which time the zero potential is applied over conductor 336a to the grid of gas-filled tube 260, firing this tube. The tube 260, in reducing the potential applied to one side of the charged condenser 255 impresses a negative potential on the plate of tube 250, thereby extinguishing this tube and thereby also permitting the condenser 151 to again charge at a constant rate as shown in Fig. 5—I. Tube 260 is subsequently extinguished by the oscillation through inductance 256 and condenser 255, as already described.

With the arrangement of the gas tubes 250 and 260, as described, the condenser 151 may be discharged and the tube 250 extinguished within a very short interval and with a comparatively small maximum current, thereby reserving a longer charging period for the condenser 151 than can be secured with rotating distributors or event with tuned relay timing circuits.

This condition will now prevail until the transition I arrives, in response to which relay 140 is operated back to marking, causing relays 150 and 160 to operate back to marking, but leaving relays 170 and 180 in their spacing positions.

Condenser 161 is now disconnected from the reference potential and connected to the constant current conductor 336a for charging, as shown in Fig. 5—J.

Condenser 151 is disconnected from the constant current conductor 336a, having been charged to a potential proportional to the duration of the preceding charging time. Thus, in the case of transition I arriving at the standard transition time t the charge on condenser 151 would be such that its voltage would be equal to the reference potential at the marking contact of relay 150; however, since transition I arrives early, the voltage on condenser 151 is less negative than the reference potential, as shown in Fig. 5—I, and at the instant the marking contact of relay 150 closes an equalizing current will flow in circuits that will now be traced.

One of these circuits includes the peak-voltmeter and may be traced from condenser 151 through marking contact of relay 150, resistance 152 and condenser 153 in multiple, conductor 342a, resistance 341, primary of transformer 344, conductor 342 to the reference potential at point 348. Thus, a current impulse will be induced in the secondary winding of transformer 344 through one of the rectifiers 351 and 352 and condenser 361 to ground. The consequent potential on condenser 361 is applied to the tube 360 which thus sets up an unbalanced condition in the bridge circuit for the peak-voltmeter 370 which thus gives a deflection proportional to the current strength in transformer 344 and, therefore, proportional to the displacement of the marking transition I from the standard transition instant t.

The equalizing current from condenser 151 may be traced over another circuit from marking contact of relay 150 over break contact b of relay 118, through the bias-meter 190, resistance 193, break contact c of relay 118, condenser 163 and resistance 162 in multiple and break contact c of relay 118 to the reference potential on the conductor 342a. The bias-meter 190, being highly damped by the large shunt condenser 192, will give integrated deflections for a succession of equalizing impulses proportional to the average bias of the impulses being measured. This meter may be calibrated by adjustment of resistance 191. In the present instant the meter will be deflected to indicate the marking bias of transition I.

In the meantime, the impulse circuit is passing through its second cycle and the detector tube 240 is passing through its second conducting period at the end of which, and shortly before the center of the second dot period, a positive impulse is applied from transformer 241 to tube 250. As this tube becomes conducting, the discharging oscillatory circuit including inductance 256 is connected over conductor 253, spacing contact of relay 170 and conductor 336a through marking contact of relay 160 to condenser 161, which now quickly discharges, as shown in Fig. 5—J. When the potential of conductor 336a reaches zero by the discharge of condenser 161 through inductance 256, the gas tube 260 is again fired, thereby quickly extinguishing the gas tube 250 and subsequently extinguishing itself by the discharging of condenser 255. When tube 250 becomes non-conducting, condenser 161 again charges up from the constant current conductor 336a until the arrival of the spacing transition II.

When transition II arrives, relays 150 and 160 operate to spacing and condenser 151 now is connected for charging from the constant current conductor 336a and the charging of condenser 161 is discontinued. Since transition II arrived late with respect to the standard transition instant 2, the charge on condenser 161 is such that its potential is more negative than the reference potential. Therefore, when the marking contact of relay 160 closes, an equalizing current will flow between condenser 161 and the reference potential over the circuit from condenser 161, marking contact of relay 160, break contact f of relay 118, resistance 162 and condenser 163 in multiple over conductor 342a through transformer 344, and conductor 342 to the reference potential at point 348. The equalizing current through transformer 344 will now affect the peak-voltmeter 370 in the same manner as described above for transition I, the deflection of the meter needle being in the same direction as before; the equalizing current will be about the same as before, because the transition II was displaced with respect to the transition instant 2 about as much as was transition I with respect to transition instant 1.

At the same time bias-meter 190 is affected by the equalizing current through resistance 162 and condenser 163 in multiple over a circuit from the right side of resistance 162, break contact c of relay 118, through resistance 193, meter 190, break contact b of relay 118 through resistance 152 and condenser 153 in multiple to the left side of resistance 162, which is connected to the reference potential. The bias-meter will now be affected in the same direction as for the previous reading for transition I, thus indicating marking bias.

The impulse circuit now enters its third cycle and near the middle of the standard dot period condenser 151 is again discharged by the flashing of tube 250 and connected to recharge from the constant current supply.

The charging now continues until the transition III arrives. As shown in Fig. 5—B this transition arrives later with respect to the standard transition instant 3 than did transition II with respect to transition instant 2. Therefore, when relays 140, 150 and 160 operate to marking, a greater equalizing current flows from condenser 151, giving a higher reading on the peak-voltmeter 370 and deflecting the bias-meter 190 towards the side indicating spacing bias.

Condenser 161 now charges up to the reference potential and near the center of the dot period it is discharged and then again charges at a constant rate.

With no transition IV, relays 140, 150 and 160 remain in marking position and condenser 161 continues to charge until the middle of the next dot period when it is again discharged and commences to recharge at a constant rate.

Transition V arrives on time so that, when relays 140, 150 and 160 operate to spacing, the condenser 161 will be charged exactly to the reference potential and no equalizing current will flow. Due to the rectifying action of the tubes 351 and 352 the charge on condenser 361 cannot be reduced when the equalizing current for a given transition is less than for a previous transition. Thus upon comparison of the transition V, the peak-voltmeter will continue to show the deflection for transition III. The bias-meter 190, having received no impulse since transition III, tends toward a zero-bias reading. Condenser 151 now charges, discharges and recharges until the arrival of the "stop" transition to marking. With this transition arriving on time, there will be no equalizing current.

During the reception of all these transitions the condensers 222 and 222a have been slowly discharging and have commenced to be charged in the opposite direction so that shortly after the standard transition instant 6, corresponding to the "stop" transition, the voltage on these condensers will be equal to the potential at point 226 supplied from potentiometer 181. At this time the potential at point 227 passes through zero and tends to become positive thereby rendering the rectifier tube 225 conducting and also conditioning the tube 220 for conduction. Point 227 thus is grounded through the rectifier tube 225.

With the "stop" transition arriving on time relay 140 will have operated to marking at the time tube 220 is conditioned for conduction. With plus battery applied from the marking contact of relay 140 to the plate circuit for tube 220, current flows through the tube and the upper winding of relay 180 and operates this relay to marking, thereby disconnecting the negative potential at potentiometer 181 from point 226 so that condensers 222 and 222a will be quickly charged from battery over resistance 221 and through the rectifier tube 225 to be ready for the next "start" transition, see Figs. 5—C, D and E.

At this time relay 170 is operated to marking by its lower biasing winding, thereby again placing the stop-compensating voltage from conductor 322 upon the constant current conductor 336a and, therefore, upon condenser 161. The constant current from tube 330 now flowing through the potentiometer 320, the stop-compensating voltage applied to condenser 161 will be equal to the reference potential. Condenser 151 remains connected to the reference potential.

The operation of relay 180 to marking also placed a negative potential of 50 volts from potentiometer 181 upon the oscillating circuit for tube 230, and, due to the presence of the damping resistances 236 and 234, the oscillations are quickly restored to the steady state within the duration of the stop impulse, even allowing for a late arrival of the "stop" transition. With no impulses from the impulse circuit, the gas-filled tubes 250 and 260 thereafter remain dormant. The biasmeter 190 tends to subside toward a zero reading and the peak-voltmeter 370 maintains its peak reading. The entire test circuit is, therefore, restored to normal awaiting the arrival of the next "start" transition.

When the "stop" transition arrives early or late, there will, of course, be an equalizing current between condenser 151 and the reference potential, which may affect both meters.

If the "stop" transition should arrive so late that the charge on condensers 222 has already reached the point where the grid potential of tube 220 has conditioned this tube for conduction, the character timing circuit would await the operation to marking of relay 140 in response to the "stop" transition, since tube 220 cannot conduct with negative potential applied to its plate from relay 140. Upon arrival of the "stop" transition the entire circuit would be restored to stop condition, as described above. There is thus no danger of the character timing circuit restoring the system to stop condition before the "stop" transition arrives, and it is insured that even a large displacement of the "stop" transition will be accurately indicated on the meters.

When the "stop" transition is greatly delayed, say with a forty per cent spacing bias, a special condition arises. The operations of the system under this assumed condition are indicated in Fig. 5 by dotted lines in the stop interval of the different diagrams. All the operations will progress as before, and the heavy equalizing current from condenser 151 due to the delayed "stop" transition will affect the meters 190 and 370 as before. However, as the oscillatory circuit is returned to its steady-state condition by the operation of relay 180 to marking, an impulse may be produced in transformer 241. Gas tube 250, which is now connected to conductor 336a only through resistance 272, since relay 170 is operated to marking, will remain extinguished, resistance 272 being of such a high value that a discharge cannot be maintained. The condenser 161, being connected to the stop-compensating potential remains charged. Thus, there will be no effect upon the meter readings after the "stop" transition has been compared.

From the description of the operation, presented above, it will be apparent that the tube 250 is made conducting for six short intervals, as shown in Fig. 5—K, during which the unit condensers 151 or 161 are completely discharged. These conducting periods thus establish uniformly distributed reference instants which may be oriented to occur exactly at the center of each standard dot period. By charging one or the other condenser with the constant current after each reference instant, the exact arrival time of the next transition may thus be determined quantitatively by means of the two meters.

It will be noted that the bias-meter 190 during the operations incident to a signal series, as just described, has given an average reading of the bias in both marking and spacing direction relative to the arrival time of the "start" transition. It is, however, usually desirable to make separate readings for the average displacement of the mark-to-space transitions and the space-to-mark transitions relative to the arrival time of the "start" transition. For this purpose condenser 151, the charge of which is controlled by the space-to-mark transitions, is connected to the bias-meter in the marking position of relay 150 through a normally closed key M—S. When this key is opened the charges of this condenser are prevented from affecting the meter reading which thus indicates the average displacement with respect to the "start" transition of all the mark-to-space transitions. Similarly, condenser 161 is connected over the spacing contact on relay 160 through a normally closed key S—M to the other side of the meter circuit so that, when this key is opened, the charges on this condenser will not affect the meter reading, which thus will indicate the average displacement of all space-to-mark transitions relative to the "start" transition. This is the bias of the signals, provided no distortion other than bias is present.

*Alternative modes of operation*

The testing circuit, as already described, is, of course, suitable for operation on a seven-unit code, since even with maximum measurable distortion of the "stop" transition, the circuit is returned to its original steady-state condition before the end of seven unit pulse lengths.

The set may furthermore be adjusted for operation with signals using 8 or 8½ unit code of the same pulse frequency as the 7 or 7½ unit code by operation of the key 207. This opens a short circuit for resistance 223a which thus is inserted in series with resistance 223 in the slow discharge circuit for condensers 222. The discharge is thereby further retarded so that there will be time for a sixth selecting pulse before the arrival of the "stop" transition and the restoration of the test circuit to normal. The operations of the test set in response to the additional transition will be exactly the same as for the other transitions.

When key 207 is operated a warning signal is impressed on the lamp 106 from an interrupter or impulse generator 208, producing 120 impulses per minute, over key 207, conductor 113, make contacts c of relay 104 to the lamp 106, which will flicker at a fast rate, thereby indicating at the test set appearances that the circuit is adjusted to an abnormal condition. This signal is distinctly different from the demand signal of 60 impulses per minute impressed at certain times upon this lamp through the interconnecting circuit, referred to above.

As already stated, the circuit is normally arranged for an operating speed of 23 cycles per second. Provision is also made for operating the set at other speeds. For an operating speed of 28 cycles per second, key 107 is operated, thereby closing an operating circuit over make contact d on relay 104, conductor 112, through a plurality of relays 116, 201, 202 and 203, thereby operating these relays.

The operation of relay 116 replaces the condensers 151 and 161 by condensers 151a and 161a, which are of smaller capacity to receive a standard charge corresponding to the same reference potential with the same constant current as before in a shorter time, corresponding to the speed of about 28 cycles per second, or 75 words per minute with the 7½ unit code and 66 words per minute with the 8½ unit code. For a given time displacement of a signal transition relative to the corresponding standard transition instant, the difference between the condenser potential and the reference potential will be greater for these smaller condensers than before so that the equalizing current will be greater. The greater meter deflections will thus indicate a greater distortion in per cent of the pulse period, which is proper. Since the change in the size of the test condensers is inversely proportional to the change of speed, it is not necessary to recalibrate meters 190 and 370.

The operation of relay 201 disconnects the condenser 222a from the character timing circuit so that the time constant of this circuit will be changed to agree with the shorter interval between the "start" and "stop" transitions at the higher speed. The character timing circuit otherwise operates as before.

The operation of relay 202 changes the tuning of the impulse circuit by replacing adjustable condenser 232 by adjustable condenser 232a over contacts d. The decrement potentiometer 233 is also replaced by potentiometer 233a over contacts b and c. Thus, the circuit for the tube 230 oscillates with a frequency corresponding to the standard frequency of about 28 cycles per second, and the decrement may be adjusted to maintain the amplitude of oscillation substantially constant during a complete pulse series representing a character. The damping resistance in the start circuit 182 is also changed at contacts a of relay 202 by the replacement of the resistance 234 by higher resistance 234a, to insure that the oscillator circuit, at the higher frequency, is returned to steady-state condition in a critically damped manner before the end of the signal train.

The operation of relay 203 replaces the orienting potentiometers 242 and 243 by potentiometers 242a and 243a. The impulses through transformer 241 may thus be oriented within the shorter cycle without disturbance of the orientation for the normal speed of 23 cycles per second.

In all other respects, the circuit is arranged the same and operates in the same manner as described above.

When it is desired to measure signals transmitted at the speed of 15 cycles per second corresponding to 40 words per minute with the 7½ unit code, the key 107 must be operated thereby placing the circuit in the condition just described for the high speed. In addition, it is necessary to operate key 205, which adds relays 117 and 204 to the relay-operating circuit 112 from key 107.

The operation of relay 117 connects the larger unit condensers 151b and 161b into the comparison circuit replacing the other condensers.

The operation of relay 204 by its contact a, connects the condenser 222b in multiple to condenser 222 over a make contact on relay 201. The character timing circuit is thereby slowed up to allow for the longer interval between the "start" and "stop" transitions. Relay 204, by its contact b, changes the frequency of the impulse circuit by adding the fixed condenser 232b to the adjustable condenser 232a, thereby slowing up the frequency of the oscillator tube 230 to correspond to the standard dot frequency of about 15 cycles per second. The start circuit 182 from relay 180 for the oscillating circuit is changed by resistance 234a being short-circuited by contacts c of relay 204. It will, of course, be necessary to readjust condenser 232a, potentiometer 233a and the orienting potentiometers 242a and 243a for recalibration of the set. Otherwise, the circuit remains the same and operates as already described.

The operation of key 205 now places a warning signal 206 on the lamp 106 over make contact of relay 201, conductor 113a, key 207, conductor 113 and make contacts c of relay 104 to the lamp 106. The signal produced by the signal generator 206 may be characteristically different from any other signals impressed upon lamp 106, but is preferably the same as that generated by the device 208 connected to the lamp by key 207.

For operation of the test set with a commercial circuit using start-stop signals of the polar type, it is necessary to operate the key 109. This key operates relay 111, thereby disconnecting the biasing winding of relay 140 so that this relay will be operated to marking or spacing in response to opposite directions of current in the line circuit through its upper winding. Otherwise, the test circuit operates as already described and may be set for the different speeds as already described.

A reset key 110 is provided for discharging the condenser 361 in the peak-voltmeter circuit through the operation of relay 301. This is for the purpose of dissipating the charge on condenser 361 and returning the meter 370 to zero reading before commencing each observation.

The set may be calibrated for any particular type of service by connecting it through the jack 183 to suitable circuits producing standard undistorted signals of the kind to be measured.

Certain features included in the system described above and illustrated in the drawings are being claimed in a copending application for patent Serial No. 432,822, filed on even date herewith by J. R. Wilkerson, which has issued as Patent No. 2,342,318 on February 22, 1944.

What is claimed is:

1. An oscillation generator circuit for producing a predetermined series of voltage oscillations of substantially uniform wave shape which comprises a thermionic discharge vacuum tube having grid, anode and heated cathode, an oscillatory circuit including a capacitance and an inductance in multiple connection, a source of direct current connected in a non-reactive circuit between said anode and one side of said oscillatory circuit, said cathode being connected in a non-reactive circuit to the mid-point of said inductance, a non-reactive potentiometer connected from said mid-point to the other side of said oscillatory circuit and having an adjustable point connected to said grid for control of the amplitude of oscillations, a direct current source connected to place a biasing potential on said other side of said oscillatory circuit to prevent oscillations, and timed contact means adapted for disconnecting said biasing source to start oscillations and for again connecting said biasing source to stop oscillations after a predetermined number of cycles, said biasing potential being adapted to establish an initial energy condition at the starting instant in said generator circuit for immediate starting of the first cycle of harmonic oscillation substantially without extraneous transients, and said potentiometer being adjustable to effect a substantially constant amplitude of the series of oscillations between the starting and stopping by said contact means.

2. A start-stop telegraph signal testing system comprising a receiving and measuring circuit which includes a test condenser adapted to be charged during alternate pulses of a signal and to be substantially instantaneously discharged at a prefixed reference instant of time at the beginning of each period of charging, a meter circuit adapted for measuring the charge on said condenser between said periods of charging, a source of constant current for charging said condenser, and polar relay means responsive to transitions between pulses of a signal for connecting said test condenser for said alternate charging and measuring, said testing system further comprising circuit means for said instantaneous discharging of said test condenser which includes a thermionic discharge vacuum tube with a control grid, an oscillatory timing circuit connected to said grid to cause flow of space current intermittently through said tube to establish said reference instants, and normally non-conducting condenser discharging means connected to said test condenser and responsive to said flow to intermittently become conducting for discharging of said test condensers.

3. A start-stop telegraph signal testing system comprising a receiving and measuring circuit which includes a test condenser adapted to have its initial standard charge changed at a predetermined rate during alternate pulses of a signal beginning at a prefixed reference instant of time within each of said alternate pulses and ending at the subsequent transition between successive pulses, a meter circuit adapted for measuring charges on said condenser at said subsequent transitions, a source of current for changing the charge on said condenser at said predetermined rate and polar relay means responsive to transitions between pulses for connecting said test condenser for said alternate change of charge and measuring, said testing system further comprising circuit means for establishing the said standard charge of said test condenser which includes normally non-conducting condenser charge control means connected to said test condenser during said alternate pulses and adapted to be intermittently rendered conducting for establishing said initial standard charge of said test condenser at said reference instants, an impulse circuit connected to and operative to render said condenser charge control means conductive at said reference instants, and including an electronic timing circuit for establishing a series of said reference instants at equal intervals and a second electronic timing circuit for stopping the operations of said impulse circuit at the end of the series of pulses of a signal.

4. A start-stop telegraph signal testing system comprising a receiving and measuring circuit which includes a pair of test condensers adapted to be continuously charged alternately during corresponding alternate pulse periods of a signal and to be momentarily discharged alternately at prefixed reference instants of time within their period of charging, a meter circuit adapted for measuring charges on said condensers alternately between said periods of charging, a source of constant current for charging said condensers alternately, and polar relay means responsive to transitions between pulses of a signal for connecting said test condensers in alternations for said charging and measuring, said testing system further comprising circuit means for said momentary discharging of said test condensers which includes normally non-conducting condenser discharging means connected through said relay means to said test condensers during said charging periods and adapted to become intermittently conducting for quick discharging of said test condensers, an impulse circuit including an electronic vacuum tube and adapted to impress an impulse upon said discharging means on each occurrence of an electronic discharge within said tube to render said discharging means briefly conducting at each of said reference instants and also including capacitance means adjustable for timing of the discharges within said tube, and timing means including a second electronic vacuum tube and connected to stop operation of said impulse circuit on the occurrence of an electronic discharge within said second tube and also including capacitance means for timing the last said discharge to occur after a predetermined number of impulses.

5. A start-stop telegraph signal testing system comprising a receiving and measuring circuit which includes a pair of test condensers adapted to alternately have their initial standard charge changed at a predetermined rate during corresponding alternate pulses of a signal beginning at a prefixed reference instant of time within each pulse and ending at the subsequent transition between successive pulses, a meter circuit adapted for measuring charges on said condensers alternately at each transition between pulses, a source of current for changing the charge on said condensers at said predetermined rate, and polar relay means responsive to transitions between pulses for connecting said test condensers in alternations for said charging and measuring, said testing system further comprising normally non-conducting condenser charge control means connected by said relay means for quickly establishing said initial standard charge of said test condensers alternately once during each of said successive pulses, a tuned timing circuit connected to said charge control means and adapted to render said charge control means conducting for said quick establishing of charge only at prefixed intervals each equal to the standard duration of a signal pulse for establishing said reference instants, and tuned circuit means connected to said timing circuit and adapted to render said timing circuit ineffective upon said charge control means at the end of the interval required to send a signal series of pulses representing a character.

6. A start-stop telegraph signal testing system comprising a receiving and measuring circuit which includes a pair of test condensers adapted to be charged at a predetermined rate alternately during corresponding alternate pulse periods of a signal and to be substantially instantaneously discharged alternately at prefixed reference instants of time within their periods of charging, a meter circuit adapted for measuring charges on said condensers alternately between said periods of charging, a source of current for charging said condensers at said predetermined rate, and polar relay means responsive to transitions between pulses of a signal for connecting said test condensers in alternations for said charging and measuring, said testing system further comprising normally non-conducting condenser discharging means adapted when rendered conducting to quickly discharge either one of said test condensers connected by said relay means for charging at the moment, a character length timing circuit including a vacuum tube having grid, plate and filament and a slow-timing condenser connected to said grid and normally charged to render said tube conducting and having a discharge time approximately equal to the standard duration of a signal character, a start relay connected to be responsive to an incoming start pulse to render said tube non-conducting and to establish a circuit for slowly discharging said slow-timing condenser to thereby control the voltage on said grid for restoring the conducting condition of said tube and for restoring said start relay at the end of a signal character, a fast-timing circuit including a second vacuum tube having grid, plate and filament and an oscillatory circuit connected to the latter said grid and having a constant cycle duration corresponding to the standard duration of individual signal pulses, said fast-timing circuit being connected to said discharging means to render said discharging means conducting at a predetermined time of each oscillation and being connected for starting and stopping of its oscillations by said start relay means.

7. An oscillation generator circuit for producing a predetermined series of voltage oscillations of substantially uniform sine wave shape which comprises a thermionic discharge vacuum tube having grid, anode and heated cathode, a two-winding inductance having unit coefficient of coupling, a capacitance connected to said inductance to form an oscillatory circuit therewith, a non-reactive control circuit between one oscillatory winding of said inductance and the cathode-grid path in said tube, a non-reactive feedback circuit between the other winding of said inductance and the cathode-anode path in said tube and including a direct current source, a non-reactive start circuit including a second direct current source and connected to said oscillatory circuit to establish a steady-state energy condition therein, and timed contact means for opening said start circuit to start the oscillations and for again closing said start circuit to stop the oscillations after a predetermined number of oscillations, said tube being adapted to operate with a constant amplification factor, and said control circuit including adjustable means for adjustment of the amplification of said tube to maintain a substantially constant amplitude of the oscillations between the starting and stopping by said contact means, in combination with a non-reactive output circuit for said oscillation generator circuit including a second thermionic discharge means having grid, anode and heated cathode, the last said grid being connected in a non-reactive circuit to said oscillatory circuit for changing between conducting and non-conducting conditions of said second thermionic discharge means at a predetermined voltage of each cycle of oscillation, and the last said anode and cathode being connected in an impulse output circuit including a source of direct current.

8. An oscillation generator circuit for producing a predetermined series of voltage oscillations of substantially uniform sine wave shape which comprises a thermionic discharge vacuum tube having grid, anode and heated cathode, a two-winding inductance having unit coefficient of coupling, a capacitance connected to said inductance to form an oscillatory circuit therewith, a non-reactive control circuit between one oscillatory winding of said inductance and the cathode-grid path in said tube, a non-reactive feedback circuit between the other winding of said inductance and the cathode-anode path in said tube and including a direct current source, a non-reactive start circuit including a second direct current source and connected to said oscillatory circuit to establish a steady-state energy condition therein, and timed contact means for opening said start circuit to start the oscillations and for again closing said start circuit to stop the oscillations after a predetermined number of oscillations, said tube being adapted to operate with a constant amplification factor, and said control circuit including adjustable means for adjustment of the amplification of said tube to maintain a substantially constant amplitude of the oscillations between the starting and stopping by said contact means, in combination with a non-reactive output circuit for said oscillation generator circuit including a second thermionic discharge means having grid, anode and heated cathode, the last said grid being connected in a non-reactive circuit to said oscillatory circuit for changing between conducting and non-conducting conditions of said second thermionic discharge means at a predetermined voltage of each cycle of oscillation, the last said anode and cathode being connected in an impulse output circuit including a positive and negative source of direct current and a potentiometer circuit connected across the last said source and having a first adjustable point connected for applying a low voltage between the last said grid and cathode and a second adjustable point connected for applying a higher voltage between the last said anode and cathode.

9. An oscillation generator circuit for producing a predetermined series of voltage oscillations of substantially uniform sine wave shape which comprises a thermionic discharge vacuum tube having grid, anode and heated cathode, a two-winding inductance having unit coefficient of coupling, a capacitance connected to said inductance to form an oscillatory circuit therewith, a non-reactive control circuit between one oscillatory winding of said inductance and the cathode-grid path in said tube, a non-reactive feedback circuit between the other winding of said inductance and the cathode-anode path in said tube and including a direct current source, a non-reactive start circuit including a second direct current source and connected to said oscillatory circuit to establish a steady-state energy condition therein, and timed contact means for opening said start circuit to start the oscillations and for again closing said start circuit to stop the oscillations after a predetermined number of oscillations, said tube being adapted to operate with a constant amplification factor, and said control circuit including adjustable means for adjustment of the amplification of said tube to maintain a substantially constant amplitude of the oscillations between the starting and stopping by said contact means, in combination with a non-reactive output circuit for said oscillation generator circuit including a second thermionic discharge means having grid, anode and heated cathode, the last said grid being connected in a non-reactive circuit to said oscillatory circuit for changing between conducting and non-conducting conditions of said second thermionic discharge means at a predetermined voltage of each cycle of oscillation, the last said anode and cathode being connected in an impulse output circuit including a positive and negative source of direct current and a potentiometer circuit connected across the last said source and having a first adjustable point connected for applying a low voltage between the last said grid and cathode and a second adjustable point connected for applying a higher voltage between the last said anode and cathode, and said first and second adjustable points being adapted also to be adjusted in unison for varying the grid-cathode voltage and at the same time maintaining the anode-cathode voltage constant for thereby varying the said voltage of each cycle at which said second discharge means changes from conducting to non-conducting condition.

10. An oscillation generator circuit for producing a predetermined series of voltage oscillations of substantially uniform sine wave shape which comprises a thermionic discharge vacuum tube having grid, anode and heated cathode, a two-winding inductance having unit coefficient of coupling, a capacitance connected to said inductance to form an oscillatory circuit therewith, a non-reactive control circuit between one oscillatory winding of said inductance and the cathode-grid path in said tube, a non-reactive feedback circuit between the other winding of said inductance and the cathode-anode path in said tube and including a direct current source, a non-reactive start circuit including a second direct current source and connected to said oscillatory circuit to establish a steady-state energy condition therein, and timed contact means for opening said start circuit to start the oscillations and for again closing said start circuit to stop the oscillations after a predetermined number of oscillations, said tube being adapted to operate with a constant amplification factor, and said control circuit including adjustable means for adjustment of the amplification of said tube to maintain a substantially constant amplitude of the oscillations between the starting and stopping by said contact means, in combination with an impulse producing circuit connected thereto, said impulse producing circuit including a transformer and a second thermionic discharge means having grid, anode and heated cathode, the last said grid being connected in a non-reactive circuit to said oscillatory circuit for quick changing from conducting to non-conducting condition of said second discharge means at a predetermined descending voltage of each cycle of oscillations and for restoring the conducting condition at an ascending voltage of each cycle, the last said anode and cathode being connected in an impulse output circuit including a winding of said transformer and a potentiometer circuit in series connection and a positive and negative source of direct current for said potentiometer circuit, said potentiometer circuit having first and second adjustable points connected for applying a predetermined voltage between the last said cathode and anode, said adjustable points being adapted also to be adjusted in unison for adjustment of the grid-cathode voltage without change in said anode-cathode voltage constant for thereby changing the said predetermined descending voltage and therefore its time of occurrence within each cycle, said transformer being adapted to produce a secondary impulse in response to the quick cessation of current in said winding at each of said changeable times of occurrence.

11. A start-stop telegraph signal testing system comprising a receiving and measuring circuit which includes a pair of test condensers adapted to be continuously charged alternately during corresponding alternate pulse periods of a signal and to be substantially instantaneously discharged alternately at prefixed reference instants of time within their respective periods of charging, a meter circuit adapted for measuring charges on said condensers alternately between said periods of charging, a source of constant charging current, and polar relay means responsive to transitions between pulses of a signal for connecting said test condensers in alternations for said charging and measuring, said testing system further comprising circuit means for said instantaneous discharging of said test condensers which includes an oscillation generator circuit for producing voltage oscillations of a substantially sinusoidal wave shape which comprises a thermionic discharge vacuum tube having grid, anode and heated cathode, a two-winding inductance having unity coefficient of coupling, a capacitance connected to said inductance to form an oscillatory circuit therewith, a non-reactive control circuit between one oscillatory winding of said inductance and the cathode-grid path in said tube, a non-reactive feedback circuit between the other winding of said inductance and the cathode-anode path in said tube and including a direct current source, and a substantially non-reactive output circuit connected across said oscillatory circuit, said non-reactive output circuit including a second thermionic discharge means mounted in a vacuum tube and having grid, anode and heated cathode, the last said grid being connected in a non-reactive circuit to said oscillatory circuit for changing between conducting and non-conducting conditions of said second thermionic discharge means at a predetermined voltage of each cycle of oscillation, the last said anode and cathode being connected in an impulse output circuit including a source of direct current, said circuit means further including normally non-conducting condenser discharging means adapted to be connected by said relay means to said test condensers during said period of charging and connected to be intermittently rendered conducting for discharging of said test condensers in response to the impulses in said impulse output circuit, a direct current biasing source connected to said oscillatory circuit to establish a steady-state energy condition in said oscillatory circuit, and timed relay means connected to be responsive to the first operation of said polar relay means for disconnecting said biasing source to start the oscillations and timed for again connecting said biasing source to stop the oscillations after a predetermined number of cycles, the oscillating frequency of said generator circuit being equal to twice the standard pulse frequency of the telegraph signals to be tested.

12. An oscillator for producing a series of oscillations of essentially sinusoidal wave form and of a single frequency which comprises an oscillation frequency establishing circuit comprising capacitative and inductive elements, a repeating electron discharge device coupled to said circuit to sustain oscillations therein in the oscillatory condition, an energy source for said device, means for stopping and maintaining said oscillator in a non-oscillating condition, said means including means for storing the total energy incident to a given instant of steady-state oscillations in one or both of said capacitative and inductive elements, and means connected to said circuit for initiating a train of oscillations, whereby during the oscillating condition all wave cycles including the first are of equal amplitude and periodicity.

13. An oscillation generator comprising a source of electrical current and potential, a space discharge tube having an input circuit and an output circuit and an oscillation frequency determining circuit including inductance and capacity coupled to the input circuit and the output circuit, a control element of said tube being in the input circuit, means including a switch operable to one position to apply an oscillation preventing potential to said control element and to cause to flow in said inductance a current from said source and simultaneously to supply to said capacity a charge such as would simultaneously exist in said frequency determining circuit at a given instant during sustained steady-state oscillation, and said means being operable incident to another position of said switch to remove such oscillation preventing potential whereby the initial half cycle of oscillation is identical in amplitude to subsequent half cycles in the same direction.

14. An oscillator for producing a series of oscillations of essentially sinusoidal wave form and of a single frequency which comprises an oscillation frequency establishing circuit including at least one capacitative and at least one inductive element, a repeating electron discharge device coupled to said circuit to sustain oscillations therein in the oscillatory condition, an energy source for said device, means for stopping and maintaining said oscillator in a non-oscillating condition, said means including means for storing the total energy incident to a given instant of steady-state oscillations in said reactive elements, and means connected to said source for initiating a train of oscillations in which during the oscillation condition all wave cycles including the first are of equal amplitude and periodicity, in combination with a non-reactive wave energy utilizing circuit coupled to said oscillator.

15. An oscillation generator comprising a source of electrical current and potential, a space discharge tube having an input circuit and an output circuit and an oscillation frequency determining circuit including inductance and capacity coupled to the input circuit and the output circuit, a control element of said tube being in the input circuit, and switch means operable to one position to apply an oscillation preventing potential to said control element and to cause to flow in said inductance a current from said source and simultaneously to supply to said capacity a charge such as would simultaneously exist in said frequency determining circuit at a given instant during sustained steady-state oscillation, said switch means being operable to another position to remove such oscillation preventing potential whereby the initial half cycle of oscillation is identical in amplitude to subsequent half cycles in the same direction, in combination with a non-reactive potential control circuit coupled to said oscillation generator to utilize the sinusoidal wave form produced thereby by withdrawing but negligible oscillatory energy therefrom.

16. An oscillation generator for producing a plurality of series of single frequency oscillations substantially of sinusoidal wave shape, successive series being separated by stop intervals without oscillations, comprising a frequency determining circuit comprising capacity and inductance elements, said circuit being intercoupled in feedback relation to an amplifying discharge device, start circuit means including a source of energy, and circuit control means conditionable to one condition for connecting said source to said frequency determining circuit to initiate each of said stop intervals and during each stop interval to admit substantially the total energy of oscillation to said frequency determining circuit for storing therein and questionable to another condition to initiate each of said series of oscillations and release said stored energy for oscillation by disconnecting said source from said frequency determining circuit, in which said circuit control means is conditionable selectively to said conditions by incoming signals.

17. An oscillation generator for producing a plurality of series of single frequency oscillations substantially of sinusoidal wave shape, successive series being separated by oscillationless stop intervals, comprising a frequency determining circuit including at least one capacity and at least one inductance element, said circuit being intercoupled in feedback relation to an amplifying discharge device, start circuit means including a source of energy and circuit control means conditionable to one condition for connecting said source to said frequency determining circuit to initiate each of said stop intervals and admit substantially the total energy of oscillation to said frequency determining circuit for storing therein, and conditionable to another condition to initiate each of said series of oscillations and release said stored energy for oscillation by disconnecting said source from said frequency determining circuit, said frequency determining circuit including inductance and capacitance elements in series in a closed oscillatory circuit and said source being connected, during the stop condition, to cause a steady current flow in said inductance corresponding substantially to said energy oscillation.

WILTON T. REA.
JEFFERSON R. WILKERSON.